US012610976B2

(12) United States Patent
Mao et al.

(10) Patent No.: US 12,610,976 B2
(45) Date of Patent: Apr. 28, 2026

(54) PREPARATION METHOD OF MOGROSIDE AND PROCESSING DEVICE THEREFOR

(71) Applicant: GUILIN SANLENG BIOTECH CO., LTD, Guilin (CN)

(72) Inventors: Wude Mao, Guilin (CN); Rongjun Tang, Guilin (CN); Jian Wei, Guilin (CN); Haiyuan Lin, Guilin (CN); Xiaoyan Liang, Guilin (CN)

(73) Assignee: GUILIN SANLENG BIOTECH CO., LTD, Guilin (CN)

( * ) Notice: Subject to any disclaimer, the term of this patent is extended or adjusted under 35 U.S.C. 154(b) by 719 days.

(21) Appl. No.: 18/165,554

(22) Filed: Feb. 7, 2023

(65) Prior Publication Data

US 2024/0180224 A1 Jun. 6, 2024

(30) Foreign Application Priority Data

Dec. 1, 2022 (CN) .......................... 202211532482.6

(51) Int. Cl.
*A23N 1/02* (2006.01)
*A23N 7/08* (2006.01)

(52) U.S. Cl.
CPC ................. *A23N 1/02* (2013.01); *A23N 7/08* (2013.01)

(58) Field of Classification Search
CPC ............. A23N 1/02; A23N 7/08; Y02A 40/90
See application file for complete search history.

(56) References Cited

U.S. PATENT DOCUMENTS

| | | | |
|---|---|---|---|
| 8,261,659 B2 * | 9/2012 | Neto ......................... | A23N 1/02 |
| | | | 99/510 |
| 9,538,883 B2 * | 1/2017 | Fister .................... | A47J 43/255 |
| 9,675,101 B2 * | 6/2017 | Conti ....................... | A23N 1/02 |
| 10,272,448 B1 * | 4/2019 | Arnold, III ............... | A23L 2/72 |
| 10,433,577 B2 * | 10/2019 | Benoit ................ | B67D 3/0003 |
| 2013/0220146 A1 * | 8/2013 | Bertocchi .............. | A23B 2/465 |
| | | | 99/483 |

(Continued)

FOREIGN PATENT DOCUMENTS

| | | | | |
|---|---|---|---|---|
| CN | 102488294 A | * | 6/2012 | |
| CN | 205306711 U | * | 6/2016 | ........... A47J 19/023 |
| CN | 206182976 U | * | 5/2017 | |

(Continued)

*Primary Examiner* — Thien S Tran

(74) *Attorney, Agent, or Firm* — Nitin Kaushik

(57) ABSTRACT

The invention discloses a preparation method of mogroside and a processing device therefor, which relates to the technical field of sweet glycoside preparation. The device includes a collection cabin, a collection pipe, a peeling assembly and a centrifugal separation assembly, wherein the collection cabin is provided with the peeling assembly, the peeling assembly can peel a fresh fructus momordicae, and a peeled pulp enters the collection cabin so that the collection cabin can transport the pulp to the centrifugal separation assembly; the centrifugal separation assembly includes a separation cabin, a disc, a centrifugal cylinder and a filter pipe, wherein the disc is rotatably arranged in the separation cabin, a plurality of the centrifugal cylinders distributed in a circle are fixed at intervals on an outer peripheral side of the disc, the separation cabin being further provided with a liquid injection head corresponding to the centrifugal cylinder.

9 Claims, 4 Drawing Sheets

(56)                    References Cited

U.S. PATENT DOCUMENTS

2014/0087012 A1*    3/2014  Sharma ................ A61K 9/2054
                                                          424/777
2020/0367532 A1*   11/2020  Nguyen ................... A23L 2/60

FOREIGN PATENT DOCUMENTS

CN           106967142  A      7/2017
CN           110283224  A      9/2019
CN           110357936  A     10/2019

* cited by examiner

PREPARATION METHOD OF MOGROSIDE AND PROCESSING DEVICE THEREFOR

CROSS-REFERENCE TO RELATED APPLICATIONS

The application claims priority to Chinese patent application No. 2022115324826, filed on Dec. 1, 2022, the entire contents of which are incorporated herein by reference.

FIELD OF THE INVENTION

The invention relates to the technical field of preparation of sweet glycosides, in particular, to a preparation method of mogroside and a processing device therefor.

BACKGROUND OF THE INVENTION

At present, to prepare the mogroside, usually a crushing mechanism is used to carry out overall crushing of fructus momordicae, then a solvent is used to extract a juice from it, and then the juice is sterilized, dried and concentrated. During the process, the shell of fructus momordicae is also sent into the crushing mechanism, resulting in different components of the crushed body, making the extraction generally targeted, and the shell of fructus momordicae also has pharmacological effects. Therefore, it is necessary to consider separating the shell from the pulp of fructus momordicae for processing. In addition, the existing crushing mechanism often crushes the seeds of fructus momordicae, which greatly affects the taste of the subsequent sweet glycosides.

Therefore, it is necessary to provide a preparation method of mogroside and a processing device therefor to solve the problems raised in the above-mentioned background technology.

BRIEF SUMMARY OF THE DISCLOSURE

To achieve the above purpose, the invention provides the following technical solutions: a processing device for mogroside includes a collection cabin, a collection pipe, a peeling assembly and a centrifugal separation assembly, wherein the collection cabin is provided with the peeling assembly, the peeling assembly may peel a fresh fructus momordicae, and a peeled pulp enters the collection cabin; one side of the collection cabin is provided with the collection pipe, the other side of the collection pipe is communicated with a material exhaust pipe, and the pulp may be transported to the centrifugal separation assembly through the material exhaust pipe;

the centrifugal separation assembly includes a separation cabin, a disc, a centrifugal cylinder and a filter pipe, wherein the disc is rotatably arranged in the separation cabin, a plurality of the centrifugal cylinders distributed in a circle are fixed at intervals on an outer peripheral side of the disc, the filter pipe is placed in the centrifugal cylinder, and one side of the centrifugal cylinder close to a middle part of the disc is provided with a through hole so as to allow the filter pipe to move out of the centrifugal cylinder from the through hole, the disc being further provided with a plurality of first discharge ports corresponding to the filter pipe, the separation cabin being further provided with a liquid injection head corresponding to the centrifugal cylinder.

Further, preferably, when the filter pipe moves to be coaxial with the first discharge port, the pulp in the filter pipe may fall from the first discharge port; the separation cabin is further provided with a second discharge port corresponding to the first discharge port, and the separation cabin is further provided with a third discharge port.

Further, preferably, a bottom part of the filter pipe is provided with an annular sealing ring;

an upper surface of the disc is further provided with a slideway for providing guidance for the movement of the filter pipe, and the slideway extends into the centrifugal cylinder.

Further, preferably, a middle part of the separation cabin is provided with an electromagnet, and iron bars are embedded in the filter pipe at circumferential intervals.

Further, preferably, a bottom part of the collection cabin is provided with a liquid exhaust port, and the liquid exhaust port is filled with filter cottons;

the material exhaust pipe is an L-shaped pipe;

a bottom part of the collection pipe is provided with a concave surface, one side of the collection pipe away from the material exhaust pipe is provided with an extension pipe, and the extension pipe is slidably connected with a push plate.

Further, preferably, the peeling assembly includes a pressure supply assembly, a rotary drive assembly and a cutting assembly; the pressure supply assembly is provided with a pressure supply end for rotatably connecting a first jaw, and the rotary drive assembly is provided with a rotating end for rotatably connecting a second jaw; the first jaw and the second jaw cooperate with each other to press and rotate the fresh fructus momordicae; the cutting assembly comprises a cutting machine and a second telescopic rod; the cutting machine is located in the collection cabin, a top part of the collection cabin is provided with a through groove corresponding to the cutting machine, and the cutting machine is driven by the second telescopic rod to move up and down.

Further, preferably, the pressure supply assembly includes a first rotating seat, a sliding seat and a first telescopic rod; the first rotating seat is rotatably arranged at an upper part of the collection cabin and is driven by a first motor, the first rotating seat is slidably connected with the sliding seat, and the sliding seat is driven by the first telescopic rod, the sliding seat serving as the pressure supply end of the pressure supply assembly to be rotatably connected with the first jaw.

Further, preferably, the rotary drive assembly includes a second rotating seat, a fixing seat and a third motor; the second rotating seat is rotatably arranged at the upper part of the collection cabin and is driven by a second motor, the second rotating seat is fixed with the fixing seat, and the fixing seat serves as the rotating end of the rotary drive assembly to be rotatably connected with the second jaw, the second jaw being driven by the third motor.

Further, preferably, the first jaw and the second jaw have the same structure; the second jaw includes a turntable, the turntable is connected with a mounting plate by a spring, and the mounting plate is fixed with an arc-shaped suction claw.

A preparation method of mogroside includes steps of:

S1, peeling the fresh fructus momordicae by the peeling assembly, and then falling the pulp into the collection pipe;

S2, sending the pulp to the separation bin by the push plate one by one, wherein each time the push plate pushes, the disc rotates by one step;

S3, injecting a solvent into the filter pipe by the liquid injection head one by one;

S4, driving the disc to rotate at a first speed so that the solvent penetrates into the pulp to extract a juice deeply, and then driving the disc to rotate at a second speed so that the juice and the solvent are separated from the filter pipe and exhausted from the third discharge port;

S5, absorbing and separating the filter pipe from the centrifugal cylinder by the electromagnet one by one after stopping rotating the disc at the high speed, so that the pulp in the filter pipe is exhausted through the first discharge port;

S6, collecting a liquid from the third discharge port, which is subjected to sterilization, drying and concentration.

Compared with the prior art, the preparation method of mogroside and a processing device therefor provided by the invention has the following beneficial effects:

In the embodiment of the invention, the peeling assembly is equipped to peel the fresh fructus momordicae so that the shell and the pulp may be processed separately when the sweet glycosides are prepared, which improves the targetness of using the solvent to extract the juice, and the damage to the seeds may be reduced by the centrifugal separation assembly, which greatly guarantees the taste of the subsequent sweet glycosides; further, the juice in the pulp may be extracted by injecting the solvent, and the pulp and the juice may be separated from each other by centrifugation, so that the two cooperate with each other to achieve a good effect.

Figure 1:
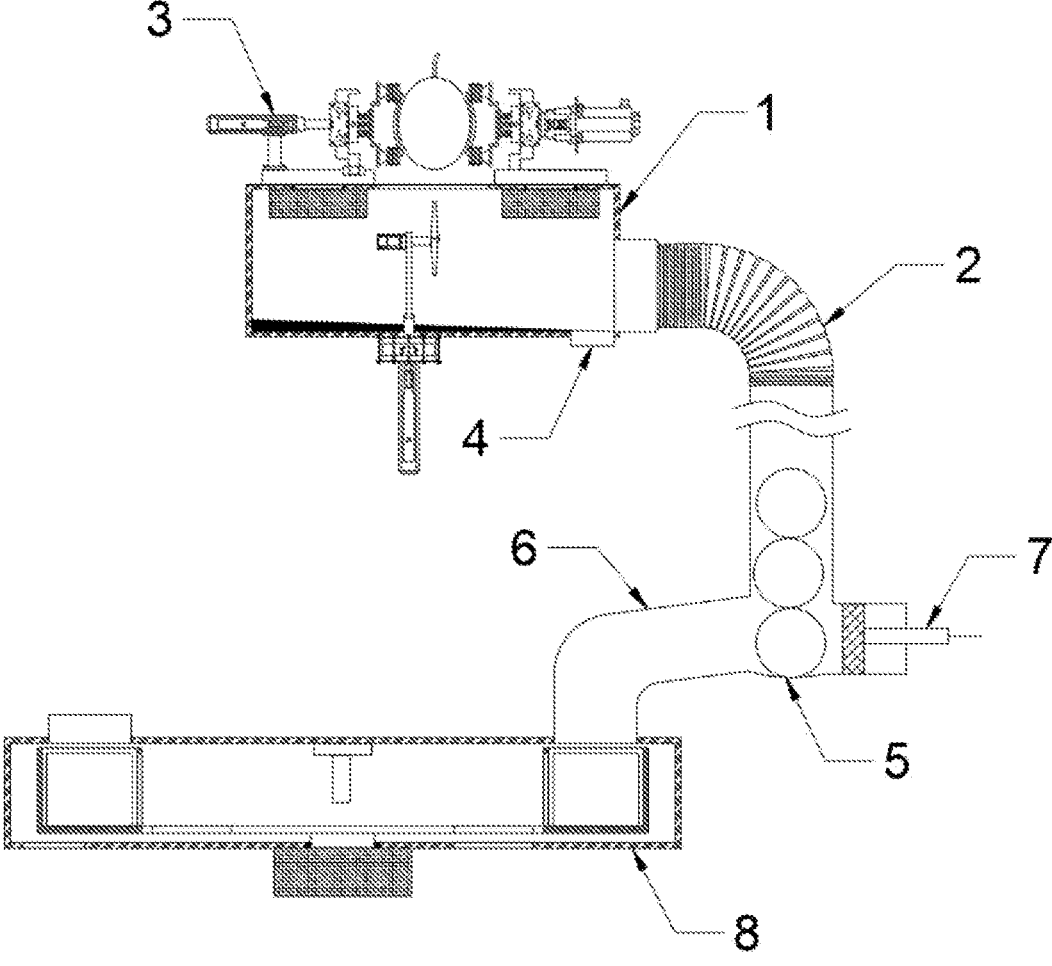
FIG. 1 is a structural diagram of a processing device of mogroside.
Figure 2:
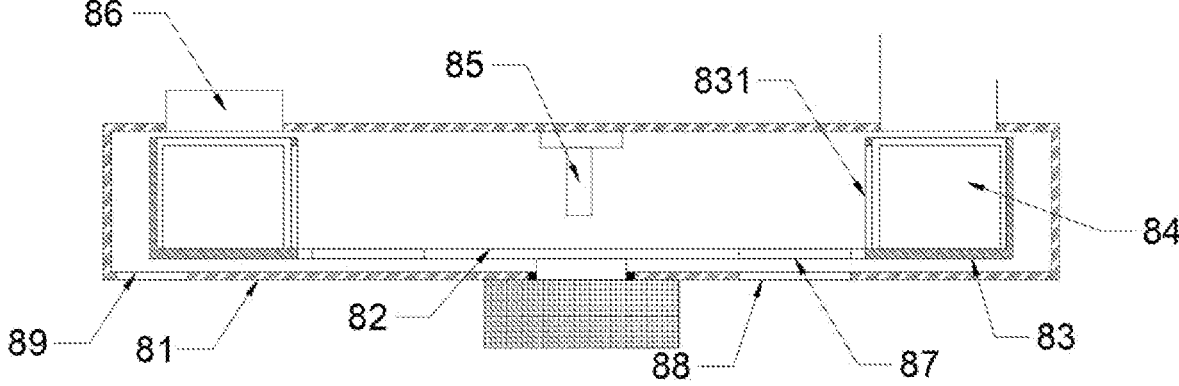
FIG. 2 is a structural diagram of a centrifugal separation assembly of the processing device of mogroside.

In figures: 1. Collection bin; 2. Collection pipe; 3. Peeling assembly; 4. Liquid exhaust port; 5. Concave surface; 6. Material exhaust pipe; 7. Push plate; 8. Centrifugal separation assembly; 81. Separation bin; 82. Disc; 83. Centrifugal cylinder; 84. Filter pipe; 85. Electromagnet; 86. Liquid injection head; 87. First discharge port; 88. Second discharge port; 89. Third discharge port; 831. Through hole; 31. First rotating seat; 32. Sliding seat; 33. First jaw; 34. First telescopic rod; 35. First motor; 36. Second rotating seat; 37. Fixing seat; 38. Second jaw; 39. Second motor; 310. Third motor; 311. Cutting machine; 312. Second telescopic rod; 381. Turntable; 382. Mounting plate; 383. Spring; 384. Absorption jaw.

DETAILED DESCRIPTION OF THE EMBODIMENTS

Embodiment: with reference to FIGS. 1 to 4, in an embodiment of the invention, a processing device for mogroside includes a collection cabin 1, a collection pipe 2, a peeling assembly 3 and a centrifugal separation assembly 8, wherein the collection cabin 1 is provided with the peeling assembly 3, the peeling assembly 3 may peel a fresh fructus momordicae, and a peeled pulp enters the collection cabin 1, while a peel is processed by other processing equipment to achieve targeted processing;

one side of the collection cabin 1 is provided with the collection pipe 2, the other side of the collection pipe 2 is communicated with a material exhaust pipe 6, and the pulp may be transported to the centrifugal separation assembly 8 through the material exhaust pipe 6;

the centrifugal separation assembly 8 includes a separation cabin 81, a disc 82, a centrifugal cylinder 83 and a filter pipe 84, wherein the disc 82 is rotatably arranged in the separation cabin 81, a plurality of the centrifugal cylinders 83 distributed in a circle are fixed at intervals on an outer peripheral side of the disc 82, the filter pipe 84 is placed in the centrifugal cylinder 83, and one side of the centrifugal cylinder 83 close to a middle part of the disc 82 is provided with a through hole 831 so as to allow the filter pipe 84 to move out of the centrifugal cylinder 83 from the through hole 831, the disc 82 being further provided with a plurality of first discharge ports 87 corresponding to the filter pipe 84, the separation cabin 81 being further provided with a liquid injection head 86 corresponding to the centrifugal cylinder 83.

Further, when the filter pipe 84 moves to be coaxial with the first discharge port 87, the pulp in the filter pipe 84 may fall from the first discharge port 87; the separation cabin 81 is further provided with a second discharge port 88 corresponding to the first discharge port, and the separation cabin is further provided with a third discharge port 89.

It should be explained that an upper part of the centrifugal cylinder 83 is open and a lower part thereof is closed;

an upper part of the filter pipe 84 is open, and a bottom part thereof is also open, so that the pulp then may pass through the top part of centrifugal cylinder 83 and fall in the filter pipe 84;

since the bottom part of centrifugal cylinder 83 is closed, the centrifugal cylinder 83 may provide a limit for the bottom part of filter pipe 84, so as to prevent the pulp from falling off;

moreover, one side of the centrifugal cylinder 83 close to a middle part of the disc 82 is provided with a through hole 831 so as to allow the filter pipe 84 to move out of the centrifugal cylinder 83 from the through hole 831, so that when the filter pipe 84 moves to be coaxial with the first discharge port 87, the pulp in the filter pipe 84 may fall from the first discharge port 87;

in fact, after the filter pipe 84 is moved out of the centrifugal cylinder 83 from the through hole 831, the disc 82 may be driven to rotate, thereby driving the filter pipe 84 to return to the centrifugal cylinder 83 under the action of centrifugal force;

the disk 82 may be driven by a power system outside the separation bin 81;

as a preferred embodiment, the bottom part of the filter pipe 84 is provided with an annular sealing ring;

as a preferred embodiment, an upper surface of the disc 82 is further provided with a slideway for providing guidance for the movement of the filter pipe 84, and the slideway extends into the centrifugal cylinder 83.

As a preferred embodiment, a middle part of the separation cabin 81 is provided with an electromagnet 85, and iron bars are embedded in the filter pipe 84 at circumferential intervals. That is to say, by energizing the electromagnet, the corresponding filter pipe 84 may be driven to move out of the centrifugal cylinder 83 along the slideway.

In addition, the filter pipe 84 has a solid-liquid separation function, preferably, having a multi-layer filter screen, so that the liquid may pass through the filter pipe 84 only under relatively large hydraulic pressure.

As a preferred embodiment, a bottom part of the collection cabin 1 is provided with a liquid exhaust port 4, and the liquid exhaust port 4 is filled with filter cottons;

the material exhaust pipe 6 is an L-shaped pipe;

a bottom part of the collection pipe 2 is provided with a concave surface 5, one side of the collection pipe 2 away from the material exhaust pipe is provided with an extension pipe, and the extension pipe is slidably connected with a push plate 7.

The push plate 7 may be driven by an external cylinder to slide;

in implementation, temporary storage of the pulp may be achieved through the cooperation of the concave surface 5 and the collection pipe 2;

therefore, when the centrifugal separation assembly 8 is used to separate the pulp and the juice, the collection of the pulp from the collection bin 1 may be realized through the collection pipe 2;

it should also be explained that the pulp may sent to the separation bin 81 by the push plate 7 one by one, wherein each time the push plate 7 pushes, the disc 82 rotates by one step; during the process, the solvent may be injected into the filter pipe 84 one by one by using the liquid injection head 86;

the overall work steps have a high degree of fit and high efficiency.

Moreover, the juice in the pulp may be extracted by injecting the solvent, and the pulp and the juice may be separated by centrifugation, wherein the two cooperate with each other to achieve a good effect.

Figure 3:
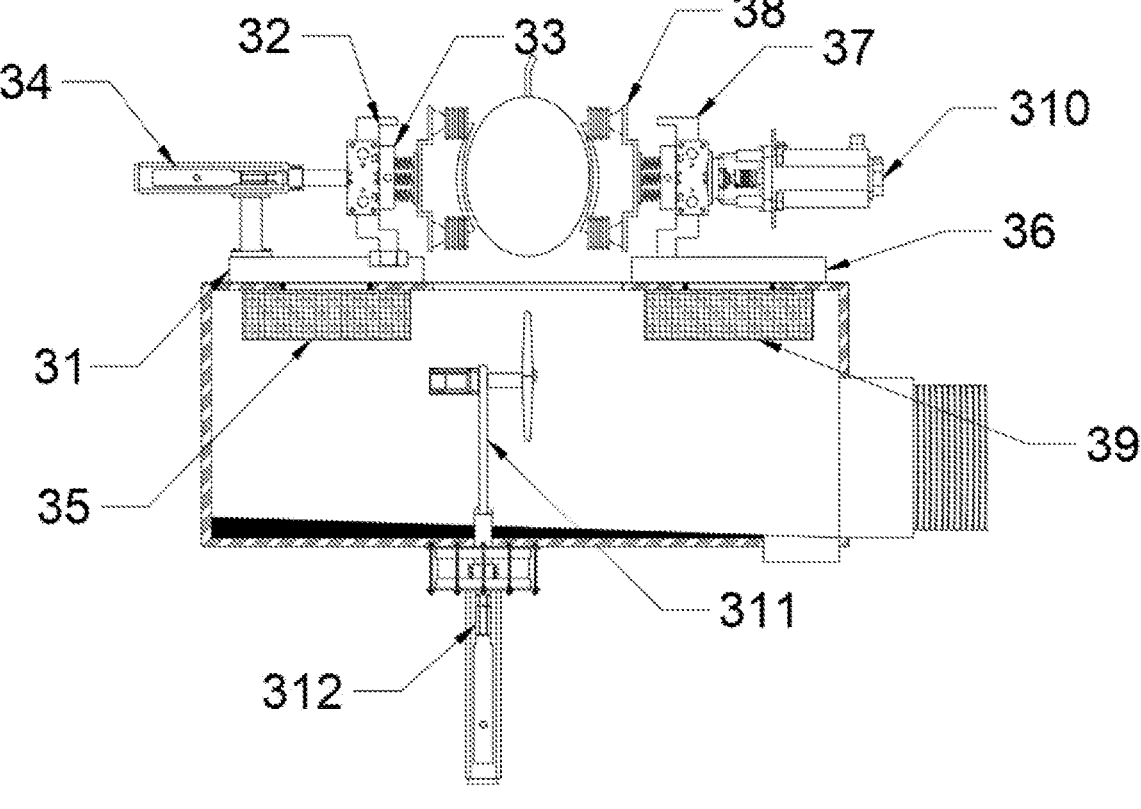
FIG. 3 is a structural diagram of a peeling assembly of the processing device of mogroside.
Figure 4:
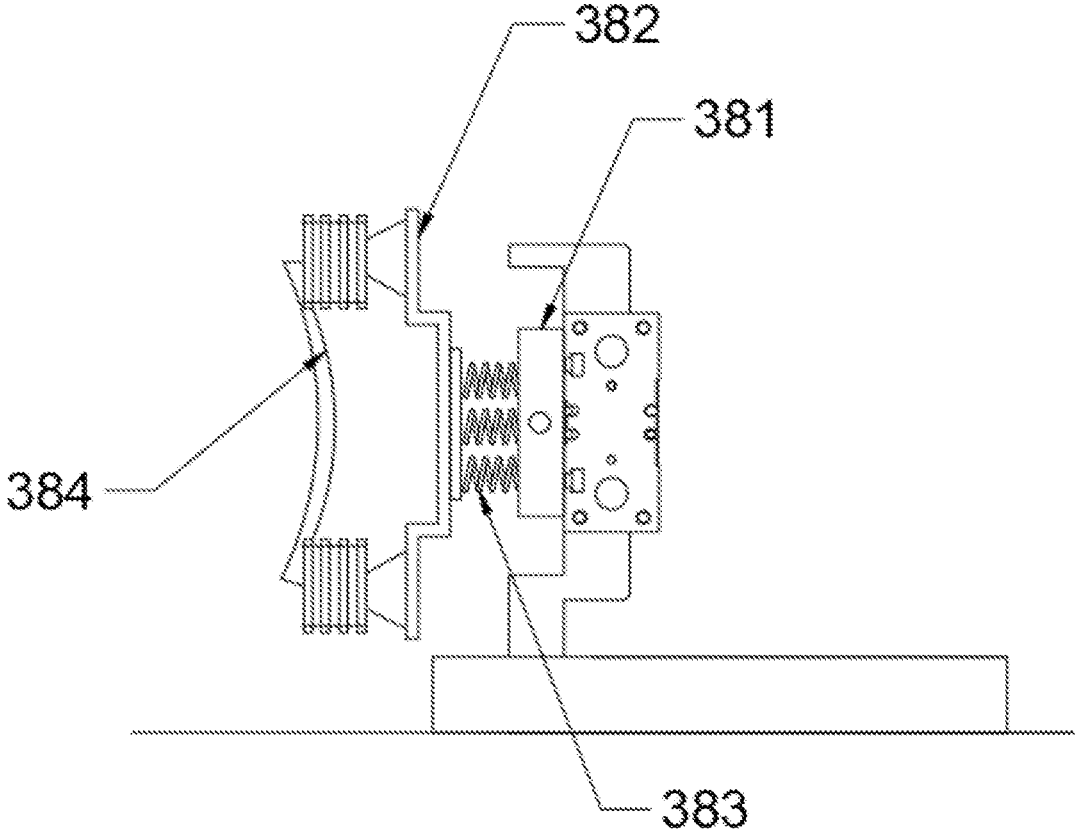
FIG. 4 is a structural diagram of a second jaw of the processing device of mogroside.

In the embodiment, as shown in FIG. 3, the peeling assembly 3 includes a pressure supply assembly, a rotary drive assembly and a cutting assembly; the pressure supply assembly is provided with a pressure supply end for rotatably connecting a first jaw 33, and the rotary drive assembly is provided with a rotating end for rotatably connecting a second jaw 38; the first jaw 33 and the second jaw 38 cooperate with each other to press and rotate the fresh fructus momordicae; the cutting assembly includes a cutting machine 311 and a second telescopic rod 312; the cutting machine 311 is located in the collection cabin 1, a top part of the collection cabin 1 is provided with a through groove corresponding to the cutting machine 311, and the cutting machine 311 is driven by the second telescopic rod 312 to move up and down.

In addition, the pressure supply assembly includes a first rotating seat 31, a sliding seat 32 and a first telescopic rod 34; the first rotating seat 31 is rotatably arranged at an upper part of the collection cabin 1 and is driven by a first motor 35, the first rotating seat 31 is slidably connected with the sliding seat 32, and the sliding seat 32 is driven by the first telescopic rod 34, the sliding seat 32 serving as the pressure supply end of the pressure supply assembly to be rotatably connected with the first jaw 33.

Further, the rotary drive assembly includes a second rotating seat 36, a fixing seat 37 and a third motor 310; the second rotating seat is rotatably arranged at the upper part of the collection cabin 1 and is driven by a second motor 39, the second rotating seat is fixed with the fixing seat 37, and the fixing seat 37 serves as the rotating end of the rotary drive assembly to be rotatably connected with the second jaw 38, the second jaw 38 being driven by the third motor 310.

Also, the first jaw 33 and the second jaw 38 have the same structure; the second jaw 38 includes a turntable 381, the turntable 381 is connected with a mounting plate 382 by a spring 383, and the mounting plate 382 is fixed with an arc-shaped suction claw 384.

Therefore, in implementation, manual means or external manipulator or external feeding equipment are used to send the fresh fructus momordicae between the first jaw 33 and the second jaw 38, and then the first telescopic rod 34 is extended to drive the first jaw 33 to clamp the fresh fructus momordicae between the first jaw 33 and the second jaw 38, so that the continuous small-scale pressing of fresh fructus momordicae may be realized through the small expansion and contraction of the first telescopic rod 34, wherein it should be explained that whether the fructus momordicae is fresh or dried, the shell is easy to separate from the pulp inside, which is the characteristic of fructus momordicae;

on this basis, the cutting of the shell of fresh fructus momordicae may be realized by driving the cutting machine 311 to move upward through the second telescopic rod 312; during this process, the third motor 310 drives the second jaw 38 to rotate, which may make the first jaw and the fresh fructus momordicae between the first jaw and the second jaw rotate; after the fresh fructus momordicae rotates for a circle, the cutting machine 311 may completely cut the shell of the fresh fructus momordicae, then the first telescopic rod 34 shrinks to fall the pulp of fresh fructus momordicae into the collection bin 1, and then the first motor 35 drives the first rotating seat 31 to rotate, so that the first jaw 33 turns to other directions, thereby sending the shell of the fresh fructus momordicae on the first jaw 33 to the outside of the collection bin 1; at the same time, the second motor drives the second rotating seat to rotate, so that the second jaws turn to other directions, thereby sending the shell of the fresh fructus momordicae on the second jaw to the outside of the collection bin 1, followed by resetting;

therefore, the outside of the collection bin 1 is further provided with a collection frame;

further, the adsorption claw 384 may be an arc-shaped negative pressure adsorption claw.

A preparation method of mogroside includes the following steps:

S1. the fresh fructus momordicae is peeled by the peeling assembly 3, and then the pulp falls into the collection pipe 2;

S2. the pulp is sent to the separation bin 81 by the push plate 7 one by one, wherein each time the push plate 7 pushes, the disc 82 rotates by one step;

S3. a solvent is injected into the filter pipe 84 by the liquid injection head 86 one by one;

S4. the disc is driven to rotate at a first speed so that the solvent penetrates into the pulp to extract a juice deeply, and then the disc is driven to rotate at a second speed so that the juice and the solvent are separated from the filter pipe 84 and exhausted from the third discharge port 89;

S5. the filter pipe 84 is absorbed and separated from the centrifugal cylinder 83 by the electromagnet 85 one by one after rotating the disc is stopped at the high speed, so that the pulp in the filter pipe 84 is exhausted through the first discharge port 87;

S6. a liquid is collected from the third discharge port 89, which is subjected to sterilization, drying and concentration.

What has been described above is only a preferred embodiment of the invention, but the protection scope of the invention is not limited thereto. Any equivalent replacement or change made by those skilled in the art according to the technical solution of the invention and its inventive concept within the technical scope disclosed in the invention shall fall within the protection scope of the invention.

What is claimed is:

1. A processing device for mogroside, comprising a collection cabin (1), a collection pipe (2), a peeling assembly (3) and a centrifugal separation assembly (8), wherein the collection cabin (1) is provided with the peeling assembly (3), the peeling assembly (3) may peel a fresh fructus momordicae, and a peeled pulp enters the collection cabin (1); one side of the collection cabin (1) is provided with the collection pipe (2), another side of the collection pipe (2) is communicated with a material exhaust pipe (6), and the pulp may be transported to the centrifugal separation assembly (8) through the material exhaust pipe (6);

the centrifugal separation assembly (8) comprises a separation cabin (81), a disc (82), a centrifugal cylinder (83) and a filter pipe (84), wherein the disc (82) is rotatably arranged in the separation cabin (81), a plurality of the centrifugal cylinders (83) distributed in a circle are fixed at intervals on an outer peripheral side of the disc (82), the filter pipe (84) is placed in the centrifugal cylinder (83), and one side of the centrifugal cylinder (83) close to a middle part of the disc (82) is provided with a through hole (831) so as to allow the filter pipe (84) to move out of the centrifugal cylinder (83) from the through hole (831), the disc (82) being further provided with a plurality of first discharge ports (87) corresponding to the filter pipe (84), the separation cabin (81) being further provided with a liquid injection head (86) corresponding to the centrifugal cylinder (83);

wherein when the filter pipe (84) moves to be coaxial with the first discharge port (87), the pulp in the filter pipe (84) may fall from the first discharge port (87); the separation cabin (81) is further provided with a second discharge port (88) corresponding to the first discharge port, and the separation cabin is further provided with a third discharge port (89).

2. The processing device for mogroside according to claim 1, wherein a bottom part of the filter pipe (84) is provided with an annular sealing ring;

an upper surface of the disc (82) is further provided with a slideway for providing guidance for the movement of the filter pipe (84), and the slideway extends into the centrifugal cylinder (83).

3. The processing device for mogroside according to claim 1, wherein a middle part of the separation cabin (81) is provided with an electromagnet (85), and iron bars are embedded in the filter pipe (84) at circumferential intervals.

4. The processing device for mogroside according to claim 1, wherein a bottom part of the collection cabin (1) is provided with a liquid exhaust port (4), and the liquid exhaust port (4) is filled with filter cottons;

the material exhaust pipe (6) is an L-shaped pipe;

a bottom part of the collection pipe (2) is provided with a concave surface (5), one side of the collection pipe (2) away from the material exhaust pipe is provided with an extension pipe, and the extension pipe is slidably connected with a push plate (7).

5. The processing device for mogroside according to claim 1, wherein the peeling assembly (3) comprises a pressure supply assembly, a rotary drive assembly and a cutting assembly; the pressure supply assembly is provided with a pressure supply end for rotatably connecting a first jaw (33), and the rotary drive assembly is provided with a rotating end for rotatably connecting a second jaw (38); the first jaw (33) and the second jaw (38) cooperate with each other to press and rotate the fresh fructus momordicae; the cutting assembly comprises a cutting machine (311) and a second telescopic rod (312); the cutting machine (311) is located in the collection cabin (1), a top part of the collection cabin (1) is provided with a through groove corresponding to the cutting machine (311), and the cutting machine (311) is driven by the second telescopic rod (312) to move up and down.

6. The processing device for mogroside according to claim 5, wherein the pressure supply assembly comprises a first rotating seat (31), a sliding seat (32) and a first telescopic rod (34); the first rotating seat (31) is rotatably arranged at an upper part of the collection cabin (1) and is driven by a first motor (35), the first rotating seat (31) is slidably connected with the sliding seat (32), and the sliding seat (32) is driven by the first telescopic rod (34), the sliding seat (32) serving as the pressure supply end of the pressure supply assembly to be rotatably connected with the first jaw (33).

7. The processing device for mogroside according to claim 5, wherein the rotary drive assembly comprises a second rotating seat (36), a fixing seat (37) and a third motor (310); the second rotating seat is rotatably arranged at the upper part of the collection cabin (1) and is driven by a second motor (39), the second rotating seat is fixed with the fixing seat (37), and the fixing seat (37) serves as the rotating end of the rotary drive assembly to be rotatably connected with the second jaw (38), the second jaw (38) being driven by the third motor (310).

8. The processing device for mogroside according to claim 5, wherein the first jaw (33) and the second jaw (38) have identical structures; the second jaw (38) comprises a turntable (381), the turntable (381) is connected with a mounting plate (382) by a spring (383), and the mounting plate (382) is fixed with an arc-shaped suction claw (384).

9. A preparation method of mogroside, applying the processing device for mogroside according to claim 1, comprising steps of:

S1, peeling the fresh fructus momordicae by the peeling assembly (3), and then falling the pulp into the collection pipe (2);

S2, sending the pulp to the separation bin (81) by a push plate (7) one by one, wherein each time the push plate (7) pushes, the disc (82) rotates by one step;

S3, injecting a solvent into the filter pipe (84) by the liquid injection head (86) one by one;

S4, driving the disc to rotate at a first speed so that the solvent penetrates into the pulp to extract a juice deeply, and then driving the disc to rotate at a second speed so that the juice and the solvent are separated from the filter pipe (84) and exhausted from the third discharge port (89);

S5, absorbing and separating the filter pipe (84) from the centrifugal cylinder (83) by the electromagnet (85) one by one after stopping rotating the disc at the high speed, so that the pulp in the filter pipe (84) is exhausted through the first discharge port (87);

S6, collecting a liquid from the third discharge port (89), which is subjected to sterilization, drying and concentration.

* * * * *